United States Patent
Roberg

[19]

[11] Patent Number: 5,913,724
[45] Date of Patent: Jun. 22, 1999

[54] COMBINE HARVESTER

[75] Inventor: Alfons Roberg, Harsewinkel, Germany

[73] Assignee: Claas KGaA, Harsewinkel, Germany

[21] Appl. No.: 08/938,200

[22] Filed: Sep. 26, 1997

[30] Foreign Application Priority Data

Sep. 30, 1996 [DE] Germany .......................... 196 40 047

[51] Int. Cl.⁶ .................................................. A01F 12/40
[52] U.S. Cl. ................................ 460/83; 460/71; 460/84; 460/112
[58] Field of Search ................................ 460/83, 66, 69, 460/73, 80, 112, 113, 119, 82, 84, 71

[56] References Cited

U.S. PATENT DOCUMENTS

| 4,175,568 | 11/1979 | Nooyen | 460/69 |
| 4,706,690 | 11/1987 | Huhman | 460/84 |
| 5,356,338 | 10/1994 | Braunhardt et al. | 460/69 |

FOREIGN PATENT DOCUMENTS

| 0 124 628 | 5/1983 | European Pat. Off. . |
| 363650 | 11/1922 | Germany . |
| 28 30 164 | 9/1980 | Germany . |
| 19600390A1 | 12/1996 | Germany . |

*Primary Examiner*—Terry Lee Melius
*Attorney, Agent, or Firm*—Michael J. Striker

[57] ABSTRACT

A combine harvester has a cutterbar, a feed conveyor for transporting a mowing product, a threshing mechanism arranged after the feed conveyor, a separating device arranged after the threshing mechanism and including a separating rotor provided with peripheral transporting elements and a housing surrounding the separating rotor and having an upper cover hood and a lower separating basket, the transporting elements of the separating rotor being provided within a predetermined region of a transporting path with radial slots, at least one of the cover hood and the separating basket being provided with deflector elements for guidance of a threshing product, the housing having a trough with an inner side which faces the separating rotor and being provided on the inner side with guiding elements which operationally correspond to the deflector elements and which are interrupted in a region of the slots.

18 Claims, 4 Drawing Sheets

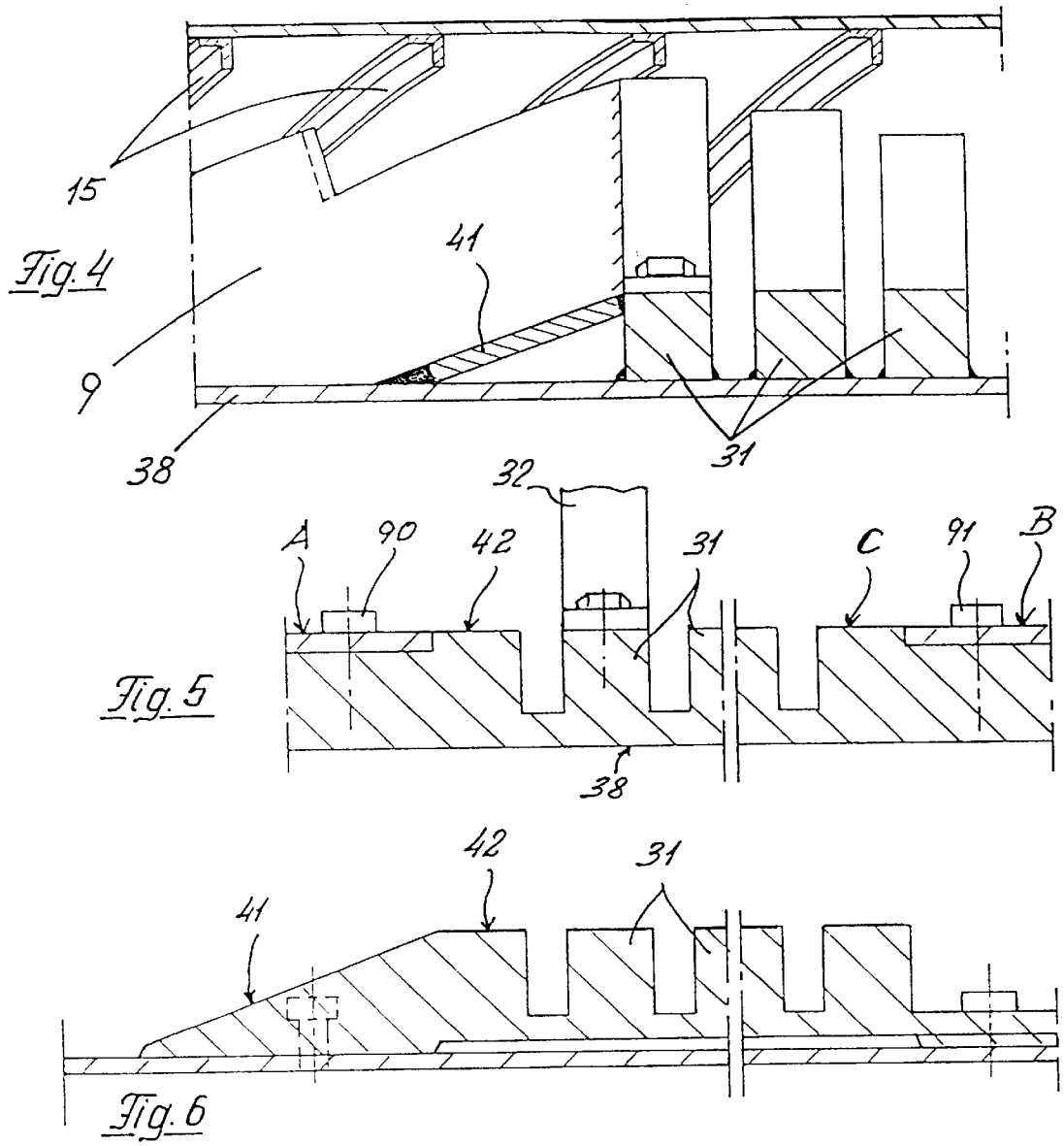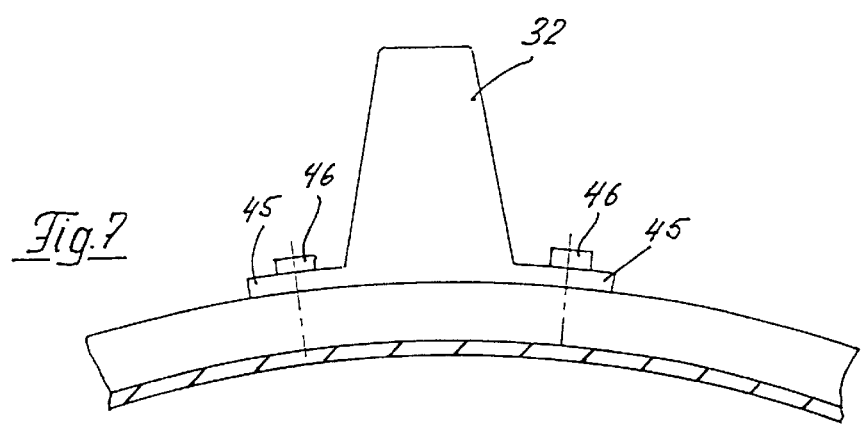

COMBINE HARVESTER

BACKGROUND OF THE INVENTION

The present invention relates to combine harvesters.

More particularly, it relates to a combine harvester which has a mowing table with an inclined feed conveyor for transporting the mowed product, a tangential or axial threshing mechanism located after the inclined conveyor, and at least one separating device which is located in a product flow direction after the inclined conveyor and operates in accordance with the principle of an axial flow. Each of the separating devices has a rotatably driven separating rotor provided on its periphery with spiral-shaped or helical transporting elements, and surrounded by a housing which is composed of an upper cover hood and a lower separating basket. The transporting elements of each of the separating rotors are provided with radial slots which are located within a certain region of a transporting path. When needed, they cooperate with stationary chopping knives arranged in a partial region of the housing, and deflector elements are arranged inside the cover hood and in some cases on the separating basket for guidance of the threshing product.

Combine harvesters of the above mentioned general type are known in the art. One of such combine harvesters is disclosed for example in the German patent document DE 196 00 390 A1. In this combine harvester, the deflector elements are placed inside the housing and extend exclusively over the region which is not utilized for chopping of the straw. Therefore in this region the throughflow of the threshing product is no longer performed continuously in all cases, so that it can lead to congestions and as a result to an increased torque for driving the separating rotor or both separating rotors.

SUMMARY OF THE INVENTION

Accordingly, it is an object of present invention to provide a combine harvester which avoids the disadvantages of the prior art.

More particularly, it is an object of the present invention to provide a combine harvester of the above mentioned type, which has a simple construction and at the same time provides a uniform throughflow of the threshing product also in the region of the axial flow chopping device, so that neither congestions nor stoppages occur which can cause an increased torque for the drive of the separating rotor.

In keeping with these objects and with others which will become apparent hereinafter, one feature of present invention resides, briefly stated, in a combine harvester in which the trough on its inner side which faces the separating rotor is provided with guiding elements which operationally correspond to the deflector elements of the cover hood and in some cases of the separating basket, which guiding elements are interrupted in the region of the throughgoing slots for the chopping knives, whereby the stalks during entry of the axial flow chopping device stands transversely to the chopping knives.

With the guiding elements arranged at the inner side of the rotor housing, a throughgoing guiding system is provided over the whole length of each separating rotor and is free of obstacles. Since a congestion of the threshing product can be excluded, no grains can be separated as losses with the straw or with the chopped product. The guiding elements extends with a spiral-shaped course of the inlet side as well as the outlet side of the chopping device directly to the throughgoing slots for the chopping knives. Therefore, it is guaranteed that after the chopping, the product is directly taken by the guiding system. Thereby a continuous throughflow is guaranteed.

In accordance with a preferable embodiment of the invention, the axial flow chopping device is located at a distance from the discharge end of the separating rotor. For this solution it is proposed that the guiding elements are arranged at both sides of the throughgoing slot for the chopping knives, and the facing ends of the guiding elements, with respect to the rotary axis of the separating rotor, are located in the same or approximately the same height. Thereby also the continuous throughflow is guaranteed, while each guiding element is composed of two individual pieces. It is especially advantageous when in dependence on the threshing product, the inclination angle is adjustable to the chopping knives.

In accordance with a first embodiment, the impact teeth which are formed by the radial slots of the transporting elements of the separating rotor are arranged on supporting rings which are spaced from one another and fixed on the separating rotor casing, for example by welding. This embodiment is especially simple. Since it is however necessary to exchange the impact teeth after a certain operational time or for example also under the action of the foreign bodies, it is proposed in accordance with a second embodiment to arrange the impact teeth which extend over the region of the axial flow chopping device, on a supporting sleeve extending over its length. The impact teeth can be produced for example by chip-forming working of the sleeve blanks. Since however the supporting rings or the supporting sleeves arranged on the separating rotor casing have a greater diameter than the separating rotor casing, they form a hindrance for a continuous throughflow.

In order to compensate this height or diameter difference, it is proposed to mount an inlet cone on the inlet side of the axial flow chopping device. This inlet cone can be welded in a welded construction, with the separating rotor casing and the first supporting ring. When the impact teeth are arranged on a supporting sleeve, it is advantageous for reduction of the individual parts to form the inlet cone of one piece with the supporting sleeve. A repair-friendly embodiment is provided when the supporting body which carries the impact teeth is composed of two parts or of at least two semi-shells which are releasably connected with the separating rotor casing. This can be performed in different ways.

In a first embodiment, both parts of the supporting sleeve can be connected with one another by an end-side clamping bend. It must be however guaranteed that the supporting sleeve do not turn relative to the separating rotor casing. For this purpose the clamping bend can be for example fixed on a separating rotor casing. In addition, it can be screwed with the supporting sleeve. In another embodiment, both semi-shells of the supporting sleeves can be screwed with the separating rotor casing. When the inlet is formed of one piece with a supporting sleeve, step-shaped openings are needed in the region of the inlet cone. On the other side, a corresponding projection can be provided with screw holes.

In the welded construction, the individual impact teeth can be exchanged only when the welding seam is removed. This is however labor-consuming. In the arrangement with a supporting body composed of two semi-shells or a number of semi-rings, it suffices to replace only the impact teeth arranged on them. In accordance with another embodiment of the invention, each individual impact tooth is screwed with a supporting ring or a supporting sleeve. It is then advantageous when each impact tooth is provided with mounting flanges arranged on two opposite sides. They are located preferably before and after the impact tooth as considered in a rotary direction.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a view showing a partial section of a separating rotor in the region of an axial flow chopping device of the inventive combine harvester;

FIG. 5 is a view showing a section of an impact tooth arranged on a supporting sleeve of the inventive combine harvester;

FIG. 6 is a view showing impact teeth provided with a one-piece inlet cone and arranged on a supporting sleeve of the inventive combine harvester; and FIG. 7 is a view showing a single impact tooth which is screwed on a supporting ring or a supporting sleeve.

DESCRIPTION OF PREFERRED EMBODIMENTS

Figure 1:
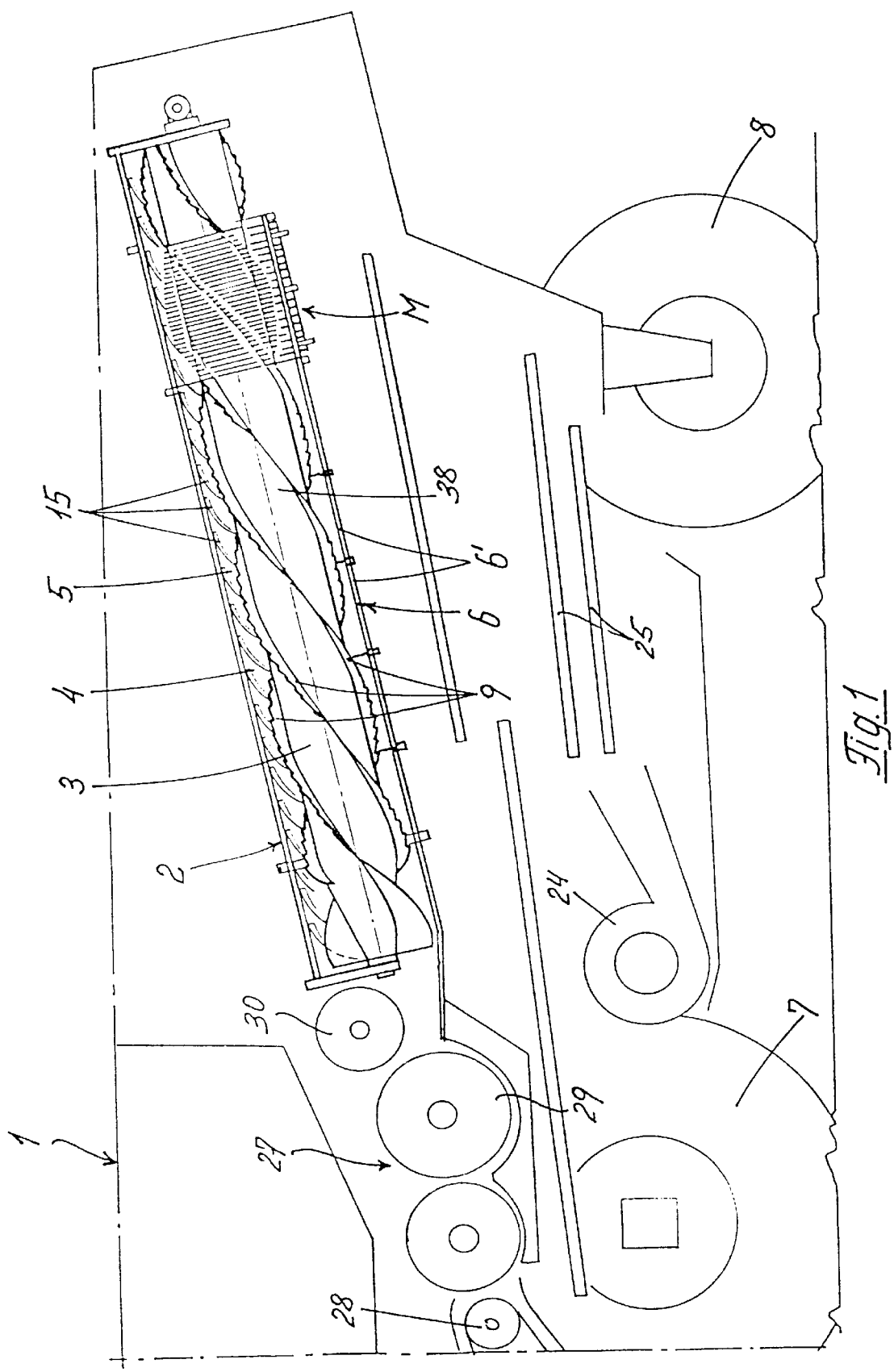
FIG. 1 is a partial side view of a combine harvester in accordance with the present invention.

A combine harvester which is partially shown in FIG. 1 is identified with reference numeral 1. It has a separating device 2 which operates in accordance with the principle of the axial flow and includes substantially a separating rotor or two separating rotors having parallel axes. The separating rotor or rotors 3 are surrounded by a housing 4. The housing 4 has an upper part formed as a hood 5 and a lower part formed as a separating basket 6.

In the shown embodiment the rotary axis of each separating rotor 3 extends transversely to the wheel axles of the wheel pair 7 and 8. As a result, the transporting direction of each separating rotor 3 is opposite to the forward traveling direction of the combine harvester 1. Further, in the shown embodiment, the rotary axis of each rotor 3 is inclined relative to a horizontal, and in particular it rises rearwardly or in other words toward a discharge end of each separating rotor 3.

An axial flow chopping device for chopping the straw is not shown here in detail. It is located at a distance from the discharge end of each separating rotor 3. For providing a continuous transportation of the threshing product, several winding-shaped or spiral-shaped transporting strips 9 are arranged on a casing 38 of the separating rotor. Their outer edges are provided with teeth. In the region of the axial flow chopping device, the transporting strips are provided with radial slots cooperating with chopping knives 13 which are arranged in series. The chopping knives are located in the region of a trough M which is in alignment with the separating basket 6. For providing a continuous transportation of the threshing product, the inner side of the hood 5 and in some cases also the inner side of the separating basket 6 has deflector elements 15. They extend either axis-parallel to the rotary axis of each separating rotor 3, or in some cases are winding-shaped or spiral-shaped.

Figure 2:
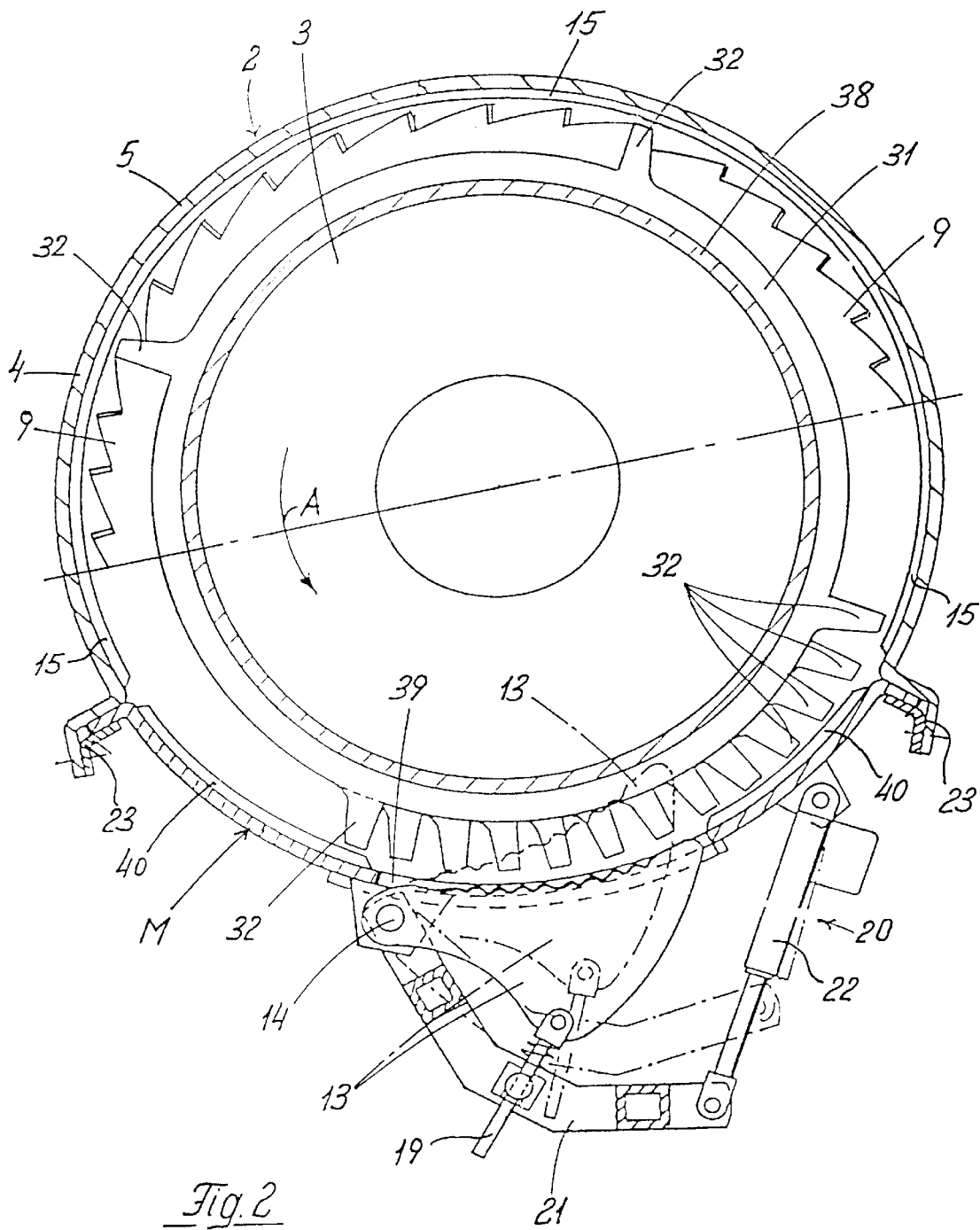
FIG. 2 is a view showing a section of the inventive combine harvester.
Figure 3:
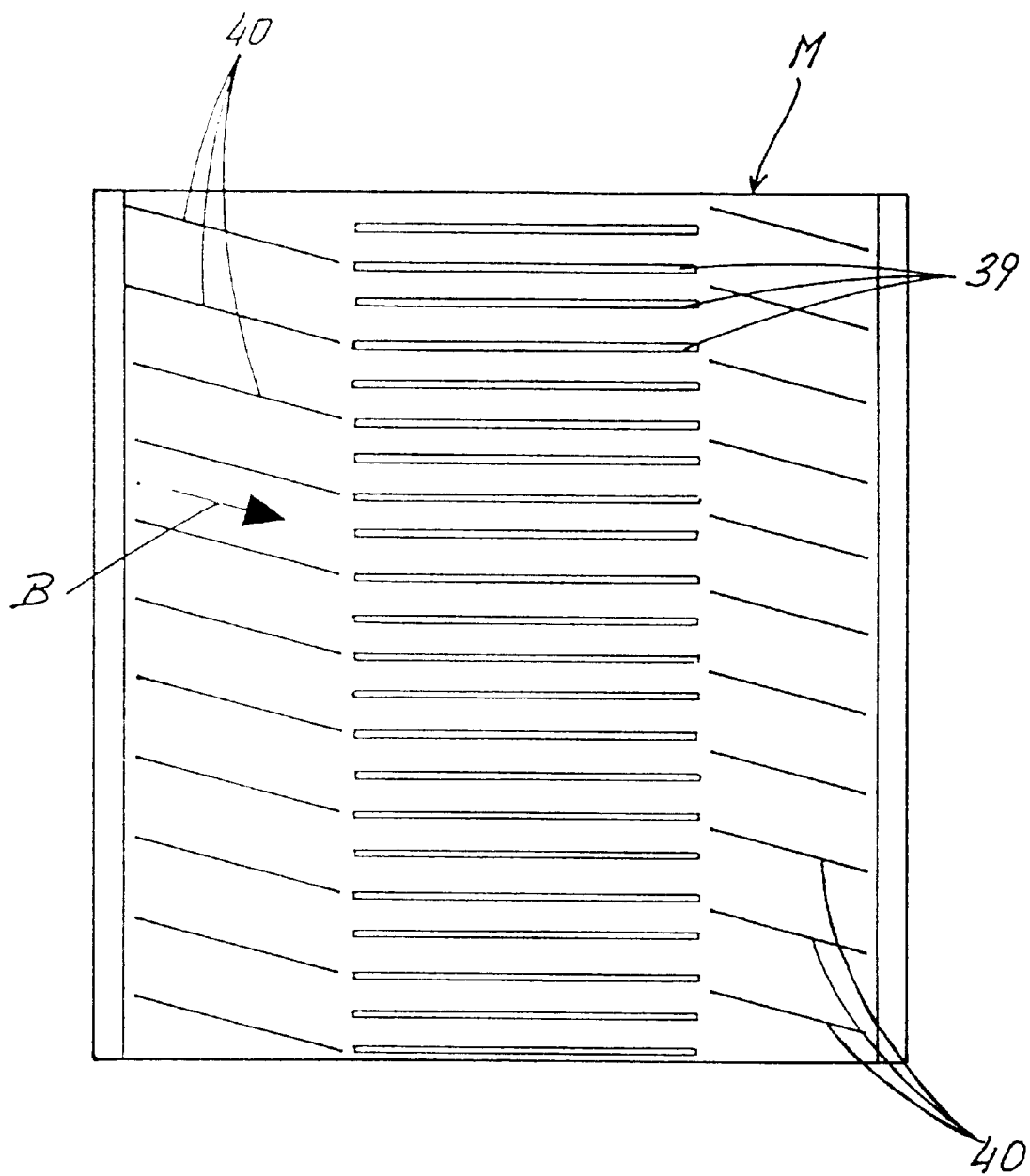
FIG. 3 is a plan view of a development of a trough of a housing of the inventive combine harvester.

FIGS. 2 and 3 show that the trough M is provided in its central region with a plurality of knife throughgoing slots 39. A plurality of guiding elements 40 are arranged at both sides of the knife throughgoing slots on the inner side of the trough M. In the region of the knife throughgoing slots 39, they are interrupted and thereby composed of two partial pieces. The facing ends of the partial pieces of the guiding elements 40 are located directly on the knife throughgoing slots 39. As can be seen from FIG. 3, the knife throughgoing slots extend over a predetermined region of the trough M. The chopping knives 13 are fixedly mounted on a receiving axle 14 which is parallel to the rotary axis of each rotor 3. The partial pieces of the guiding elements 40 are inclined to the knife throughgoing slots 39 as shown in FIG. 3. The inlet side for the product to be chopped is at the left side as shown in FIG. 3 and identified with the arrow B. The rotary direction of the separating rotor 3 is identified in FIG. 2 with the arrow A. The shape of the cross-section of the guiding elements 40 can be different. In accordance with the embodiment of FIG. 4, it is angular. The chopping knives 13 can be turned by an adjusting drive 20 to an operative position shown in dash-dot lines and to an inoperative position shown in solid lines.

The adjusting drive 20 includes an angular lever 21 which is mounted on an axis-parallel receiving axle 14, and a hydraulic cylinder-piston unit 22. Levers 19 are arranged in a bearing block on the angular lever 21 in correspondence with the number of the chopping knives, so that in the operative position the chopping knives can be individually turned against the action of a spring. The separating basket 6 includes individual baskets 6' which are releasably and displaceably connected with the hood 5 in profile rails 23. In the embodiment shown in FIG. 2, four impact teeth 32 which are offset by an angle of 90° are mounted on a supporting ring 31. The figure shows that the impact teeth of two supporting rings which follow one another in a series are offset by an angle.

In the embodiment shown in FIG. 2, it is not illustrated how the supporting rings are fixed on the casing 38 of the separating rotor. In the embodiment of FIG. 4, the supporting rings 31 which are mounted on the casing 38 of the separating rotor in series are fixed by welding seams. In order to guarantee the continuous throughflow of the threshing product, an inlet cone 41 is welded with the casing 38 of the separating rotor before the first supporting ring 31 as considered in a throughflow direction and the supporting ring is welded to it. Thereby the diameter differences between the supporting rings and the casing 38 of the separating rotor are overlapped.

In the embodiment of FIG. 5, the impact teeth 32 are placed on a supporting sleeve 42 which extends over the length of the axial flow chopping device. In this embodiment, the diameter difference between the separating rotor casing 38 and the supporting rings 31 is avoided by forming the rotor casing 38 as a three-part mounting A, B, C. It is assembled of two metal tube portions A and B and a tubular unit C which is provided with supporting rings 31 and connect these portions with one another. The diameter of all three parts A, B, C is the same. The three elements A, B, C are inserted in one another at their end sides and connected by screws 90, 91 to form a separating rotor as a unit. The portion C which is provided with the supporting rings 31 can be formed as a cast part, wherein the impact teeth 32 can be also formed by casting or screwed exchangeably with the supporting rings 31.

In the embodiments of FIGS. 5 and 6, the supporting sleeve 42 can be composed of two semi-shells. In the embodiment of FIG. 6, the supporting rings 31 are produced by a chip-removing machining or manufactured in a casting mold. The difference from the embodiment of FIG. 5 is here in the fact that the supporting sleeve 42 is fitted on the casing of the separating rotor and screwed there. The inlet cone 41 is formed on the supporting sleeve 42. In contrast to the above described embodiment, each supporting sleeve 42 can be also composed of more than two shells.

FIG. 7 shows a possibility of individual exchange for the impact teeth 32. The whole arrangement of the impact teeth 32 corresponds to the embodiment shown in the drawings.

The individual impact teeth 32 can be arranged either on a supporting ring 31 corresponding to FIG. 2 or on a supporting sleeve 42 corresponding to FIGS. 5 and 6. Each impact tooth 32 is provided with two mounting flanges 45. In the shown embodiment they are located forwardly and rearwardly as considered in a rotary direction of the separating rotor 3. The connection with the supporting ring 31 is performed by screws 46.

The combine harvester 1 which is only partially shown in FIG. 1 is further provided with a blower 24 which is located under the separating rotor 3 and with a sieve device 25 which is also located under the separating rotor 3. In a not shown manner, a known distributing device for the chopped product is provided at the discharge end of the separating rotor 3. Moreover, the combine harvester 1 is provided in a known manner with a not shown mowing table and a transporting conveyor 25, 28 which transports the mowing product to a threshing mechanism 24. Only a rear end of the transporting conveyor is shown in the drawings. The threshing mechanism 27 includes a threshing drum 29 and a transferring drum 30 supported directly before the discharge end of the separating rotor 3 transversely to its rotary axis. In contrast to the shown embodiment, the rotary axis of the separating rotor 3 can also extend parallel to the axles of the wheel pair 7, 8.

It will be understood that each of the elements described above, or two or more together, may also find a useful application in other types of constructions differing from the types described above.

While the invention has been illustrated and described as embodied in combine harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A combine harvester, comprising a cutter bar; a feed conveyor for transporting a mowing product; a threshing mechanism arranged after said feed conveyor; a separating device arranged after said threshing mechanism and including a separating rotor provided with peripheral transporting elements and a housing surrounding said separating rotor and having an upper cover hood and a lower separating basket, at least one of the said cover hood and said separating basket being provided with a deflector elements for guidance of a threshing product: a plurality of chopping knives cooperating with said transporting elements of said separating rotor, said housing having a plurality of slots through which said chopping knives extend, said housing having an inner side which faces said separating rotor and being provided on said inner side with guiding elements on both sides of said slots and which are interrupted in a region of said slots.

2. A combine harvester as defined in claim 1, wherein said deflector elements are provided both on said cover hood and said separating basket.

3. A combine harvester as defined in claim 1, wherein said guiding elements are arranged at both sides of said slots and have ends which face one another and are located substantially at a same height with respect to a rotary axis of said separating rotor.

4. A combine harvester as defined in claim 1, wherein said guiding elements are inclined relative to said chopping knives at an angle which is adjustable.

5. A combine harvester as defined in claim 1, wherein said separating rotor has a casing; and further comprising supporting rings which are arranged on said casing and spaced from one another, said supporting rings being provided with impact teeth.

6. A combine harvester as defined in claim 5, wherein said supporting rings are connected by welding with said casing of said separating rotor.

7. A combine harvester as defined in claim 1; and further comprising an axial flow chopping device; and a supporting sleeve extending over a length of said axial flow chopping device, said supporting sleeve carrying impact teeth extending over a region of said axial flow chopping device.

8. A combine harvester as defined in claim 5; and further comprising an axial flow chopping device; and an inlet cone provided at an inlet side of said axial flow chopping device for bridging a diameter difference between said casing of said separating rotor and said supporting ring.

9. A combine harvester as defined in claim 7; and further comprising an inlet cone arranged at an inlet side of said axial flow chopping device for bridging a diameter difference between a casing of said separating rotor and said supporting sleeve.

10. A combine harvester as defined in claim 9, wherein said inlet cone is formed of one-piece with said supporting sleeve.

11. A combine harvester as defined in claim 7, wherein said supporting sleeve provided with said impact teeth is composed of several parts and connected with a casing of said separating rotor by a plurality of screws distributed over a periphery.

12. A combine harvester as defined in claim 8, wherein said supporting sleeve which is provided with impact teeth is composed of several parts and connected by screws with said casing of said separating rotor, said inlet cone having stepped openings for receiving said screws and an opposite end side formed with throughgoing opening for said screws.

13. A combine harvester as defined in claim 5, wherein said impact teeth are releasably connected with said supporting rings.

14. A combine harvester as defined in claim 7, wherein said impact teeth are releasably connected with said supporting sleeve.

15. A combine harvester as defined in claim 5, wherein each of said impact teeth has two mounting flanges.

16. A combine harvester as defined in claim 15, wherein said mounting flanges are located before and after each of said impact teeth as considered in a direction of rotation of said separating rotor.

17. A combine harvester as defined in claim 7, wherein each of said impact teeth has two mounting flanges.

18. A combine harvester as defined in claim 16, wherein said mounting flanges are located before and after each of said impact teeth as considered in a rotary direction of said separating rotor.

* * * * *